P. KUEHN.
AMALGAMATOR.
APPLICATION FILED SEPT. 25, 1911.
1,019,054.
Patented Mar. 5, 1912.
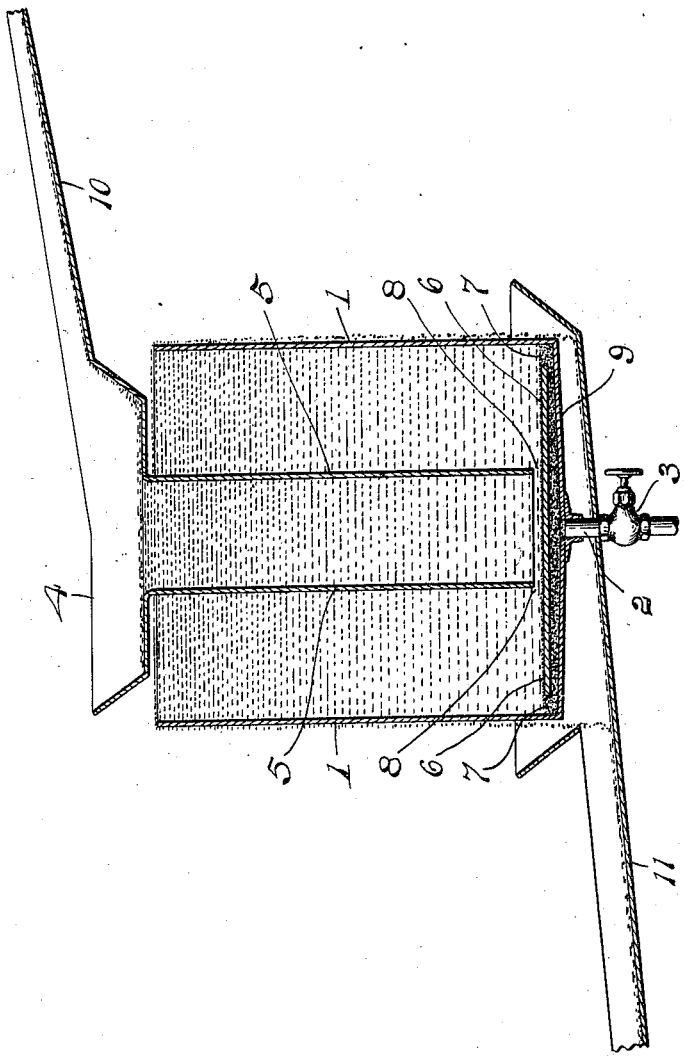
Witnesses
A. M. Dow.
E. M. Shannon.
Inventor
Paul Kuehn
By 
Attorneys

UNITED STATES PATENT OFFICE.

PAUL KUEHN, OF DETROIT, MICHIGAN, ASSIGNOR TO SHAREHOLDERS PROTECTIVE LEAGUE, LIMITED, OF DETROIT, MICHIGAN, A CORPORATION OF MICHIGAN.

AMALGAMATOR.

1,019,054.  Specification of Letters Patent.  Patented Mar. 5, 1912.

Application filed September 25, 1911. Serial No. 651,111.

*To all whom it may concern:*

Be it known that I, PAUL KUEHN, a citizen of the United States of America, residing at Detroit, in the county of Wayne and State of Michigan, have invented certain new and useful Improvements in Amalgamators, of which the following is a specification, reference being had therein to the accompanying drawings.

In devices employing mercury as the agent for recovering minerals from their ores, it has been considered necessary to provide mechanical means for agitating the mercury or pulp in order to bring active mercury into proximity with the minerals contained in the pulp to form amalgam, but when so agitated much of the mercury and amalgam passes into the waste and is lost unless recovered by a separate operation.

The object of this invention is to provide a construction which is such as to obviate the necessity for mechanical agitation and is simple in its operation and cheap to manufacture.

To this end the invention consists in providing an apparatus for so conducting pulp into a receptacle containing mercury that all of its precious metals will be brought into contact with the mercury with but slight agitation thereof, and provided with certain other new and useful features in the construction and arrangement of parts all as hereinafter set forth and more particularly pointed out in the claims reference being had to the accompanying drawing, in which The figure represents a longitudinal vertical section through a device embodying the invention.

As shown in the drawing, 1 is a suitable receptacle of any desired size or form having an open top and provided with a pipe 2 leading from its bottom, provided with a draw-off valve 3. Supported above the receptacle is a hopper 4 with its bottom slightly above the horizontal plane of the upper edge of the receptacle 1 and leading downward into the receptacle from the bottom of the hopper is a discharge tube 5 having an open lower end near the bottom of the receptacle. Supported within the receptacle with a small space between it and the bottom of the receptacle is an amalgam plate 6 of slightly less diameter than the internal diameter of the receptacle so that there is a narrow space 7 all around the plate between its edge and the vertical wall of the receptacle and between its lower surface and the bottom of the receptacle. The lower end of the tube 5 is so positioned that a narrow space 8 is left between said end and the upper surface of the plate through which space the pulp or crushed ore containing the metals to be extracted, passes into the receptacle and in passing is brought into contact with a thin coating of mercury lying upon the upper surface of the plate. Mercury 9 fills the space between the plate and the bottom of the receptacle and also forms a thin film over the upper surface of the plate, filling the space 7 at the edge thereof.

The crushed ore in the form of pulp is conducted by a suitable flush of water into the hopper 4 in any desired manner, as by a trough 10 leading from a suitable ore crusher, or the pulp may be passed over ordinary amalgam plates to take out the heavier particles of metal before passing into the hopper. From the hopper it settles down in the discharge tube and is forced out of the bottom end thereof into the receptacle by gravity. In passing through the narrow passage 8 between the lower end of the tube 5 and the plate 6, the pulp is brought in contact with the film of mercury on the plate and the particles of precious metal contained therein are amalgamated. As amalgam is formed at the lower end of the tube it is pushed radially outward over the surface of the plate by the incoming pulp and passes over its edge into the mercury space below active mercury taking its place upon the upper surface of the plate where it comes in contact with the pulp. The pulp being lighter than the mercury, rises in the receptacle and gradually overflows into a suitable trough 11 for conducting it away. The upper end of the tube 5 being only a very little above the upper end of the receptacle, the pulp will flow slowly downward through the tube and rise slowly in the receptacle, thus being agitated but slightly and not agitating the mercury at all further than to pass over the plate which is covered by a thin film of mercury. In this construction the amalgam formed on the surface of the mercury is constantly carried toward the edge of the plate, and thus active mercury is presented at the point where the pulp enters, and the pulp is forced into contact therewith by the column of pulp above it in the tube and by the quantity of pulp in the receptacle. When the mercury has become amalgamated, it may be quickly and easily drawn off through the pipe 2 and active material put in its place.

Having thus fully described my invention what I claim is:—

1. In an amalgamator, the combination of a stationary receptacle having an open upper end, a stationary plate supported within the receptacle with a space between it and the bottom of the receptacle, mercury filling the space between the plate and the bottom of the receptacle and forming a film over the top of the plate, a stationary feed member extending downward into the receptacle to feed material by gravity and having a restricted space between its open lower end and the upper surface of the plate to retard flow from the feed member into the receptacle in contact with said plate, means for conducting material into the upper end of the feed member, and means for conducting overflow away from the receptacle.

2. In an amalgamator, the combination of a stationary receptacle open at its upper end, a discharge pipe leading from the bottom of the receptacle, a stationary amalgam plate supported within the receptacle with a space between its edges and the walls of the receptacle and with a space between it and the bottom of the receptacle, a stationary feed pipe for conducting material by gravity into the said receptacle and extending downward into the same at the center thereof with a restricted space between its open lower end and the upper side of the plate, the upper end of said pipe being above the upper edge of said receptacle to cause the material to feed by gravity down the same and overflow from the receptacle.

In testimony whereof I affix my signature in presence of two witnesses.

PAUL KUEHN.

Witnesses:
LEWIS E. FLANDERS,
A. M. SHANNON.